J. L. REBER.
Cane and Thermometer.
No. 72,539.  Patented Dec. 24, 1867.
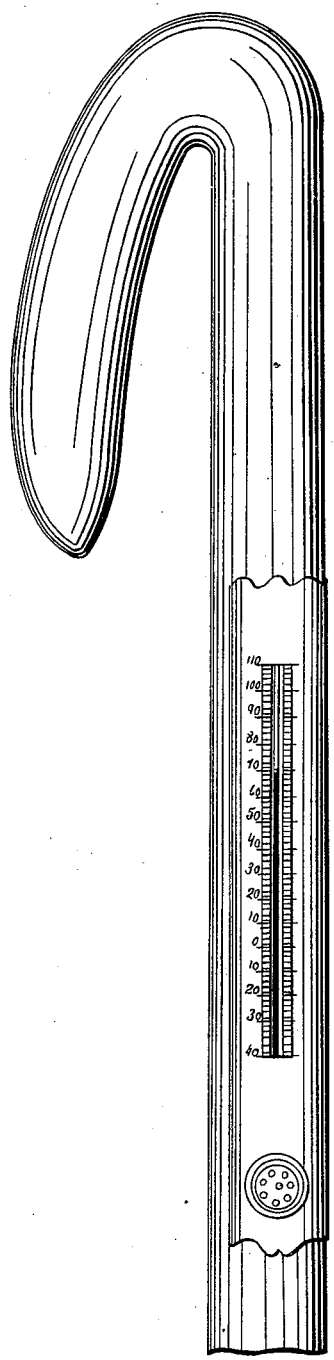
Witnesses
Theo. Insche
Wm. Treurn
Inventor
Jas. L. Reber
Per Munn &
Attorneys

United States Patent Office.

JAMES L. REBER, OF PHILADELPHIA, PENNSYLVANIA.

Letters Patent No. 72,539, dated December 24, 1867.

IMPROVEMENT IN CANE AND THERMOMETER COMBINED.

*The Schedule referred to in these Letters Patent and making part of the same.*

TO ALL WHOM IT MAY CONCERN:

Be it known that I, JAMES L. REBER, of Philadelphia, in the county of Philadelphia, and State of Pennsylvania, have invented a new and useful Improvement in the Construction and Use of Thermometers; and I do hereby declare that the following is a full, clear, and exact description thereof, which will enable others skilled in the art to make and use the same, reference being had to the accompanying drawing forming a part of this specification.

This invention relates to a new and improved method of using thermometers, whereby the same are rendered much more convenient for reference than they have hitherto been; and the invention consists in constructing the index-plate of a proper form, and attaching the thermometer permanently (or embedding it in the wood or other material) of walking-canes, umbrellas, parasols, looking-glasses, picture-frames, whip-stocks, &c., as will be hereinafter described.

The drawing represents a thermometer inserted into a walking-cane.

To adapt the thermometer to a cane, or the staff of an umbrella or parasol, or to any other article of common use, of a circular form, the plate of the thermometer is made to correspond to such form, and the thermometer is in size proportioned to the article to which it is to be applied. When thus properly formed and proportioned, the thermometer is inserted into the article, with the plate conforming to the surface, as represented, and with the tube and bulb protected beneath it.

As commonly used, the ordinary thermometer is generally out of sight, and when a person is travelling, or away from dwellings or offices where such instruments are kept, they are quite useless to him, and under favorable circumstances it requires a special effort and considerable trouble to ascertain the state of the mercury or temperature of the air. By using the thermometer according to my invention the instrument may be always at hand, whether the person is at home, on the road, or in other situation.

It is evident that my invention may be applied to umbrella-staffs, whip-stocks, picture-frames, looking-glass frames, clock-cases, and all articles of a similar nature.

Having thus described my invention, what I claim as new, and desire to secure by Letters Patent, is—

The combination of a thermometer with a walking-cane, substantially as described for the purpose specified.

JAMES L. REBER.

Witnesses:
WILSON KERR,
JOHN DALY.